Patented Mar. 16, 1926.

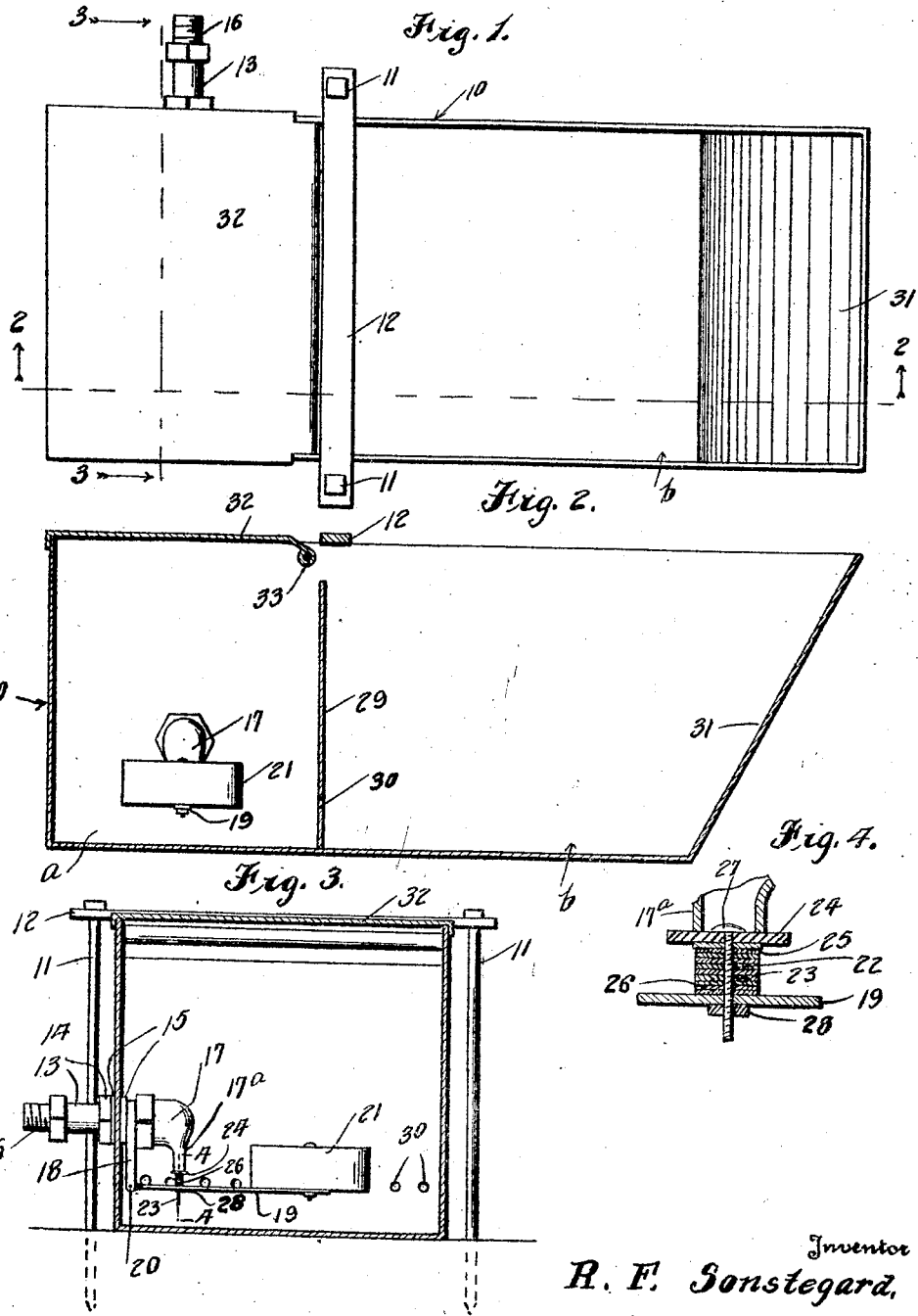

1,577,380

UNITED STATES PATENT OFFICE.

RUDOLPH F. SONSTEGARD, OF SISSETON, SOUTH DAKOTA.

WATERING TROUGH.

Application filed January 10, 1924. Serial No. 685,439.

*To all whom it may concern:*

Be it known that I, RUDOLPH F. SONSTEGARD, a citizen of the United States, residing at Sisseton, in the county of Roberts and State of South Dakota, have invented certain new and useful Improvements in Watering Troughs; and I do hereby declare the following to be a full, clear, and exact description of the invention, such as will enable others skilled in the art to which it appertains to make and use the same.

The invention has relation to means for automatically supplying drinking water for stock, such as cattle and poultry, and which maintains a predetermined level of water for convenience of stock, the trough embodying a valve chamber and a drinking chamber which are separated by a partition whereby to prevent interference of the stock with the valve mechanism or improper functioning of the latter by food or other matter obstructing the working parts thereof.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a watering trough embodying the invention,

Figure 2 is a vertical longitudinal sectional view thereof on the line 2—2 of Figure 1, Figure 3 is a transverse sectional view on the line 3—3 of Figure 1, and Figure 4 is an enlarged detail sectional view of the valve mechanism on the line 4—4 of Figure 3.

Corresponding and like parts are referred to in the following description and designated in the several views of the drawings by like reference characters.

The trough 10, which may be of any preferred construction and capacity, is subdivided by means of a vertical partition 29 into chambers $a$ and $b$, the latter constituting the drinking chamber and the former the valve chamber. A plurality of small openings 30 are formed in the lower portion of the partition 29 to admit of the water passing from the valve chamber $a$ into the drinking chamber $b$, said openings being of a size to prevent food and other matter passing therethrough from the drinking chamber to the valve chamber and obstructing the working of the valve outlet. The valve chamber is closed by means of a cover 32 which is hinged adjacent the top of the partition 29, as indicated at 33. The drinking end of the trough is inclined, as indicated at 31, to enable the stock to approach close thereto. The trough may be secured in place in any preferred way and, as shown, a crossbar 12 extends thereover and receives rods 11 which are driven into the ground the required distance so as to fix the position of the trough.

A short length of pipe 13 is let into a side of the drinking chamber and its outer end is threaded, as indicated at 16, to admit of a supply pipe (not shown) leading from a suitable source of supply to be coupled thereto. A bonnet 17 is fitted to the inner end of the pipe 13 and is provided with a nozzle $17^a$ for the discharge of the water. Washers 15 closely fitting the pipe 13 are clamped against opposite sides of the trough to insure a tight joint, said washers being clamped between a nut 14 and a hanger or bracket 18.

A float lever 19 is pivoted to the hanger or bracket 18 at 20 and is provided at its free end with a suitable float 21. A valve 24, carried by the float lever 19, is adapted to close upwardly against the lower end of the nozzle $17^a$ and cut off the supply of water to the trough when the water therein has reached the predetermined level. The valve 24 consists of a disk of leather or other suitable material and is connected to the float lever 19 by means of a bolt 27, the projecting end of which receives a nut 28. A plurality of washers 22 are confined between the valve 24 and float lever 19 and may be of leather or other desired material. Metal washers 25 and 26 are disposed at the ends of the bank of washers 23.

In practice, the water from a suitable source of supply is admitted into the valve chamber $a$ of the trough through the nozzle $17^a$ and when the water in the trough reaches a predetermined level, the float is buoyed to a given position and moves the valve 24 so as to close the nozzle and thereby automatically cut off the supply. The water passes from the valve chamber $a$ into the drinking chamber $b$ through the openings 30 in the partition 29 and any food or other matter finding its way into the drinking chamber $b$ is prevented from entering the valve chamber by means of the partition, the latter also operating to prevent the stock from interfering with the working of the valve mechanism. When the level of the water in the trough lowers, the float falls and carries the valve away from the delivery end of the supply pipe which being uncovered admits of an additional supply to replace that removed from the trough by the stock drinking therefrom.

What is claimed is:

In a watering trough, a liquid container, a supply pipe extending horizontally into the container through a wall thereof, a bonnet on the pipe within the container and having a downwardly extending discharge nozzle, a valve to control the supply of liquid through said nozzle and consisting of a plurality of superposed elements whereby their number may be diminished or increased, a float controlled lever carrying said valve, and a hanger for said lever suspended from said pipe between the wall of the container and the aforesaid bonnet.

In testimony whereof I affix my signature.

RUDOLPH F. SONSTEGARD.